US012703649B2

(12) United States Patent
Lee

(10) Patent No.: US 12,703,649 B2
(45) Date of Patent: Aug. 11, 2026

(54) HOUSEHOLD DOMESTIC WATER MONITORING DEVICE AND HOUSEHOLD DOMESTIC WATER MONITORING SYSTEM INCLUDING SAME

(71) Applicant: SMT CO., LTD., Seongnam-si (KR)

(72) Inventor: Dong Uook Lee, Seongnam-si (KR)

(73) Assignee: SMT CO., LTD., Seongnam-si (KR)

( * ) Notice: Subject to any disclaimer, the term of this patent is extended or adjusted under 35 U.S.C. 154(b) by 373 days.

(21) Appl. No.: 18/590,095

(22) Filed: Feb. 28, 2024

(65) Prior Publication Data

US 2024/0228326 A1 Jul. 11, 2024

Related U.S. Application Data

(63) Continuation of application No. PCT/KR2023/000783, filed on Jan. 17, 2023.

(30) Foreign Application Priority Data

Jan. 11, 2023 (KR) ........................ 10-2023-0003960

(51) Int. Cl.
*C02F 1/00* (2023.01)

(52) U.S. Cl.
CPC .............. *C02F 1/008* (2013.01); *C02F 1/001* (2013.01); *C02F 2201/009* (2013.01); *C02F 2209/02* (2013.01); *C02F 2209/10* (2013.01); *C02F 2209/40* (2013.01); *C02F 2301/024* (2013.01); *C02F 2307/06* (2013.01)

(58) Field of Classification Search
None
See application file for complete search history.

(56) References Cited

U.S. PATENT DOCUMENTS 6,290,908 B1 * 9/2001 Fukunaga .......... G01N 33/1893 210/85
6,607,668 B2 * 8/2003 Rela ....................... B01D 61/58 210/90
6,753,186 B2 * 6/2004 Moskoff ................. C02F 1/008 250/493.1
7,497,957 B2 * 3/2009 Frank ................. G06Q 30/0641 210/85
7,670,494 B2 * 3/2010 Frank ................. G06Q 30/0641 210/85
7,820,059 B2 * 10/2010 Frank ...................... C02F 1/008 210/85
8,160,822 B2 * 4/2012 Song ...................... G01N 33/18 702/156

(Continued)

FOREIGN PATENT DOCUMENTS

KR 10-2123595 B1 6/2020
KR 10-2022-0140919 A 10/2022
KR 10-2492185 B1 1/2023

*Primary Examiner* — Robert J Popovics
(74) *Attorney, Agent, or Firm* — Studebaker Brackett PLLC

(57) ABSTRACT

Disclosed is a household domestic water monitoring device and a household domestic water monitoring system including the same, which may provide various pieces of state information on household domestic water, such as a flow rate, water quality and a water temperature, to a user in real time, provide a state information history for the household domestic water for a certain period of time to each user, and thus improve user convenience.

8 Claims, 12 Drawing Sheets

(56) References Cited

U.S. PATENT DOCUMENTS

| | | | | |
|---|---|---|---|---|
| 8,377,314 | B2 * | 2/2013 | Frank | C02F 1/008 210/85 |
| 8,918,294 | B2 * | 12/2014 | Stevens | E03B 7/003 73/40.5 A |
| 10,048,242 | B2 | 8/2018 | Chen et al. | |
| 10,119,952 | B2 | 11/2018 | Chen et al. | |
| 11,079,127 | B2 | 8/2021 | Tran et al. | |
| 11,079,128 | B2 | 8/2021 | Tran et al. | |
| 11,112,132 | B2 | 9/2021 | Tran et al. | |
| 2010/0082265 | A1 * | 4/2010 | Song | C02F 1/008 250/281 |
| 2016/0356713 | A1 | 12/2016 | Chen et al. | |
| 2017/0199169 | A1 | 7/2017 | Chen et al. | |
| 2018/0273399 | A1 * | 9/2018 | Gaj | D06F 39/081 |
| 2020/0063999 | A1 | 2/2020 | Tran et al. | |
| 2020/0064783 | A1 | 2/2020 | Tran et al. | |
| 2020/0064815 | A1 | 2/2020 | Tran et al. | |
| 2020/0088602 | A1 | 3/2020 | Tran et al. | |
| 2023/0382764 | A1 * | 11/2023 | Guo | C02F 1/003 |
| 2024/0115979 | A1 * | 4/2024 | Zhadanov | B05B 1/18 |
| 2024/0116776 | A1 * | 4/2024 | Zhadanov | B01D 35/1475 |
| 2024/0228326 | A1 * | 7/2024 | Lee | C02F 1/008 |

* cited by examiner

FIG. 4

HOUSEHOLD DOMESTIC WATER MONITORING DEVICE AND HOUSEHOLD DOMESTIC WATER MONITORING SYSTEM INCLUDING SAME

CROSS-REFERENCE TO RELATED APPLICATIONS

The present application is a continuation of International Patent Application No. PCT/KR2023/000783, filed on Jan. 17, 2023, which is based upon and claims the benefit of priority to Korean Patent Application No. 10-2023-0003960 filed on Jan. 11, 2023. The disclosures of the above-listed applications are hereby incorporated by reference herein in their entirety.

BACKGROUND

Embodiments of the present disclosure described herein relate to a household domestic water monitoring device and a household domestic water monitoring system including the same, and more particularly, relate to a household domestic water monitoring device and a household domestic water monitoring system including the same, which may measure various pieces of state information on household domestic water currently in use and provide the measured information to a user in real time.

Tap water supplied to homes through a water supply is purified to a level at which the tap water is drinkable. However, in a process of supplying the tap water to each home, the tap water passes through old drain pipes and is polluted by various harmful substances such as rust, impurities, heavy metals, and chlorine generated from the old drain pipes.

In particular, hot water drain pipes of water having a high temperature are easy to generate harmful substances, and thus when a user uses hot water, there is a high possibility that the user uses the polluted tap water. To prepare for such pollution of the tap water, some users use a filter to purify and use the tap water. However, the user still does not know a pollution level of the tap water that the user uses, and it is difficult for the user to accurately determine a replacement period of the filter. Thus, the user is still inconvenient.

Thus, there is a need for a household domestic water monitoring device and a household domestic water monitoring system, which may provide, to the user in real time, various pieces of state information, such as a water quality state and a water temperature, of household domestic water currently in use and thus may improve user convenience.

SUMMARY

Embodiments of the present disclosure provide a household domestic water monitoring device and a household domestic water monitoring system including the same, which may provide various pieces of state information on household domestic water currently in use, such as a flow rate, water quality, and a water temperature, to a user in real time, provide a state information history for the household domestic water for a certain period of time to each user, and thus improve user convenience.

Embodiments of the present disclosure also provide a household domestic water monitoring device and a household domestic water monitoring system including the same, which may provide state information on domestic water and information on a filter replacement time to the user in real time, may automatically purchase a filter, and thus may improve user convenience.

Embodiments of the present disclosure also provide a household domestic water monitoring device and a household domestic water monitoring system including the same, which may notify that there is an abnormality in use of the domestic water when it is determined that the domestic water is used while the user is absent, may notify that there is an abnormality in non-use of the domestic water when it is determined that the domestic water is not used for a predetermined period of time while the user is at home, and thus may provide alarm information such as social elderly management, water unlocking due to mistake, and water leakage due to faucet failure.

The aspects of the present disclosure are not limited to the aspects described above, and those skilled in the art will clearly understand other aspects not described from the following description.

According to an embodiment, a household domestic water monitoring device that is connected to a faucet and measures a state of domestic water currently in use includes a faucet fastening part for connection to the faucet, a self-power generation unit that generates power by self-generating power by a fluid flow of the domestic water, the self-power generation unit supplying the power to the household domestic water monitoring device, a communication unit that supports low-power short-distance communication and controls an operation of the household domestic water monitoring device, the communication unit operating by first receiving the power from the self-power generation unit when the self-power generation unit generates the power, a measurement unit that measures a water temperature and water quality of the domestic water currently in use, a memory that stores state information on the domestic water measured by the measurement unit, and a display unit that displays the state information, wherein the communication unit transmits the state information on the domestic water to a user terminal connected through the low-power short-distance communication, and the display unit operates after the communication unit operates first.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 4 is a block diagram of a measurement unit according to the embodiment of the present disclosure;

DETAILED DESCRIPTION

Figure 1:
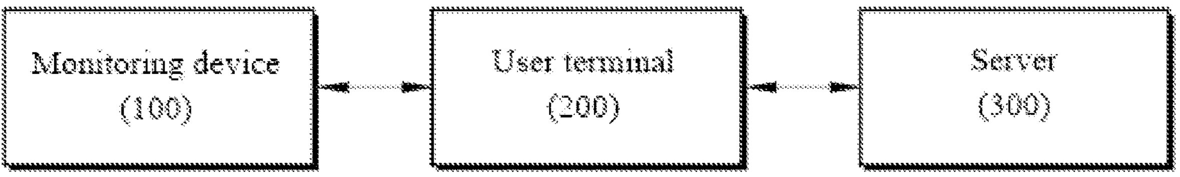
FIG. 1 is a block diagram for describing a household domestic water monitoring system according to an embodiment of the present disclosure.

Advantages and features of the present disclosure and a method of achieving the advantages and the features will become apparent with reference to embodiments described below in detail in conjunction with the accompanying drawings. However, the present disclosure is not limited to the embodiments described below but may be implemented in various forms, and the present embodiments merely make the disclosure of the present disclosure complete and are provided to completely inform the scope of the present disclosure to those skilled in the art to which the present disclosure belongs, and the present disclosure is merely defined by the scope of the appended claims.

Terms used in the present specification are intended to describe an embodiment and are not intended to limit the present disclosure. In the present specification, a singular form also includes a plural form unless specifically mentioned in a phrase. The terms "comprises" and/or "comprising" used in the specification do not exclude the presence or addition of one or more other components other than the mentioned components. Throughout the specification, the same reference numerals refer to the same components, and the term "and/or" includes each and all combinations of one or more of components mentioned. Although "first," "second," and the like are used to describe various components, it is apparent that these components are not limited by these terms. These terms are only used to distinguish a first component from a second component. Thus, it is apparent that a first component mentioned below may be a second component within the technical spirit of the present disclosure.

Unless otherwise defined, all the terms (including technical and scientific terms) used herein may be used as meanings that may be commonly understood by those skilled in the art to which the present disclosure belongs. Further, terms defined in a commonly used dictionary are not interpreted ideally or excessively unless explicitly and specifically defined.

Hereinafter, embodiments of the present disclosure will be described in detail with reference to the accompanying drawings.

Prior to description, meanings of terms used herein will be briefly described. However, since the descriptions of the terms are intended to help understanding of the specification, it should be noted that, when the terms are not explicitly stated as limiting the present disclosure, the terms are not used in the meanings of limiting the technical spirit of the present disclosure.

Figure 2:
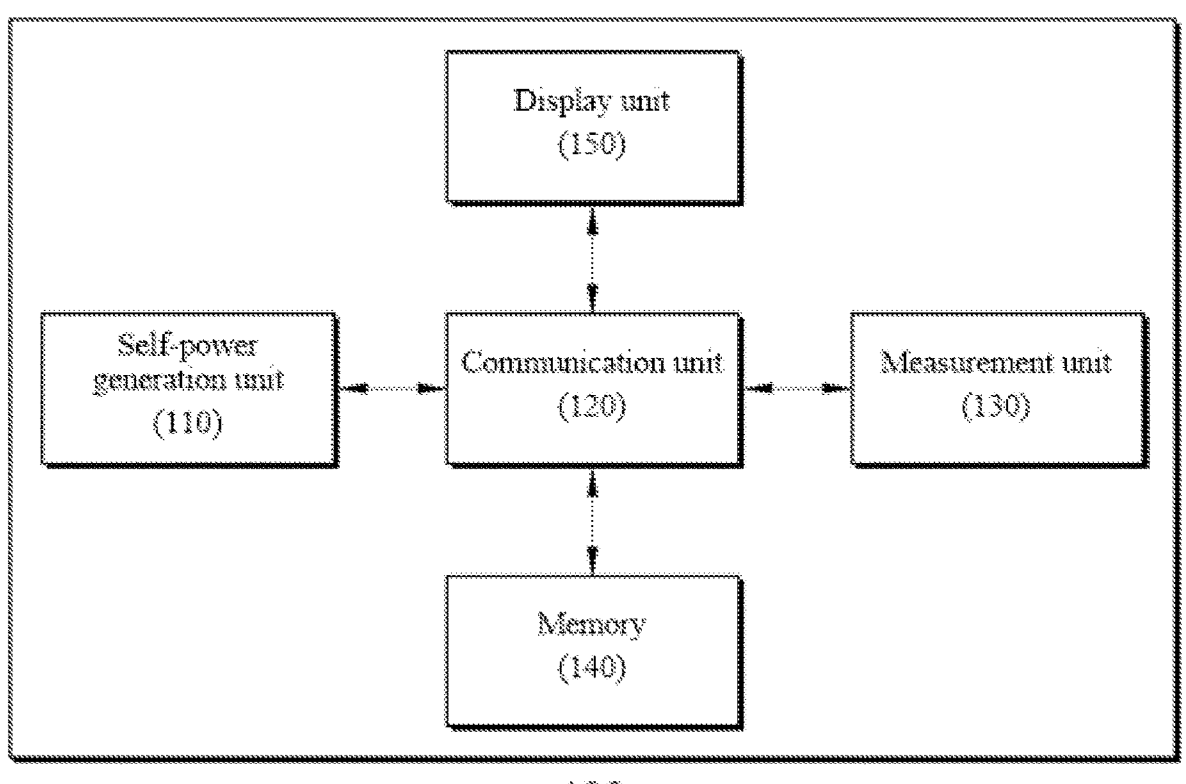
FIG. 2 is a block diagram of a household domestic water monitoring device according to the embodiment of the present disclosure.
Figure 3:
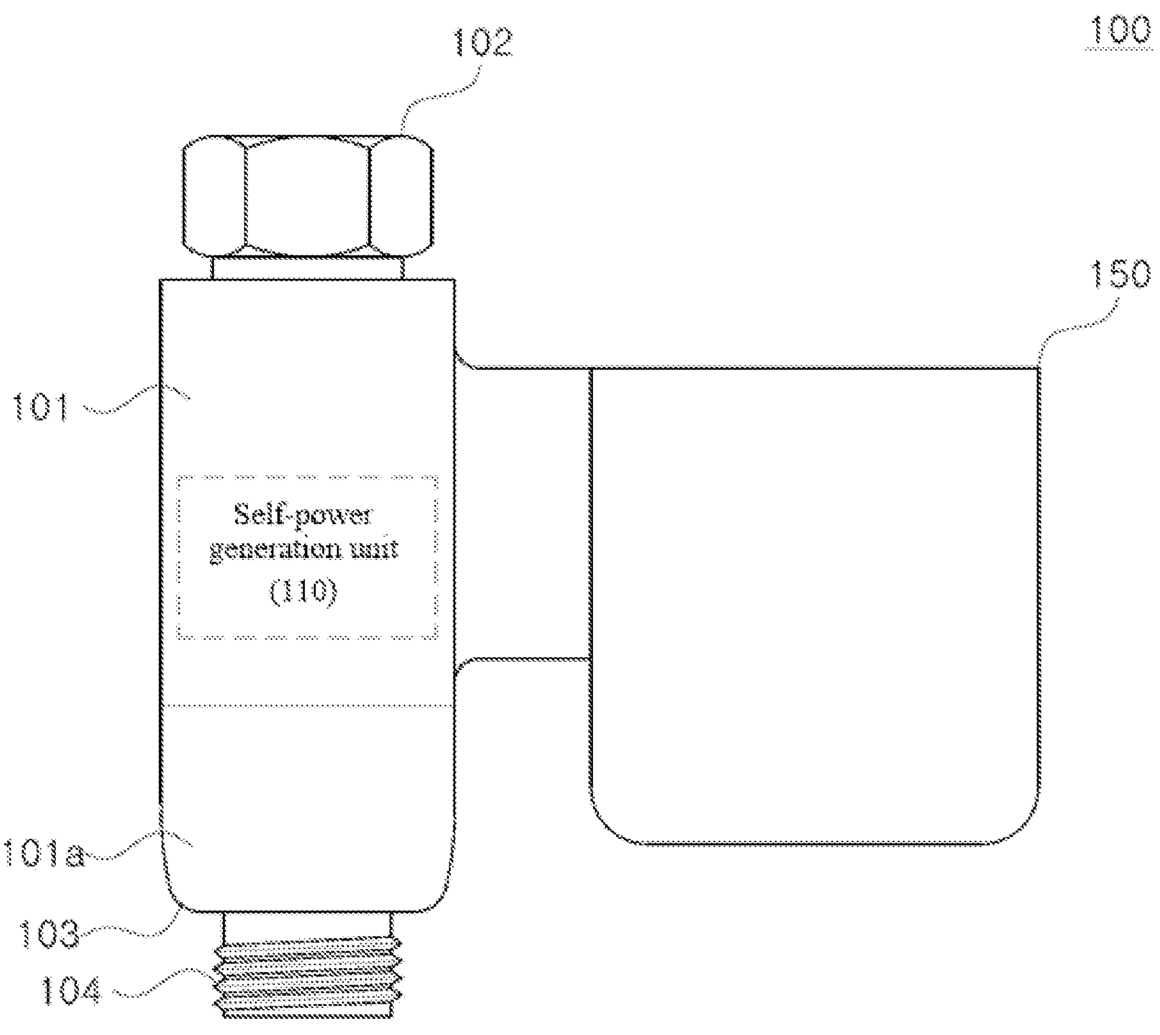
FIG. 3 is a front view of a household domestic water monitoring device according to a first embodiment of the present disclosure.
Figure 4:
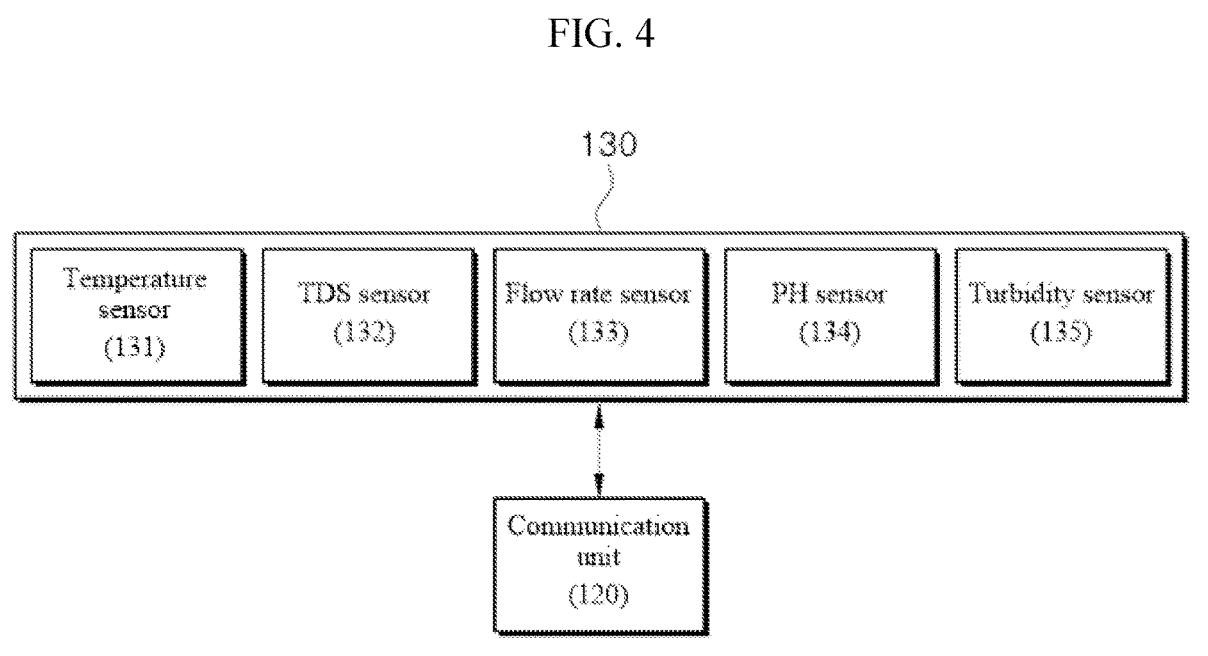
Figure 5:
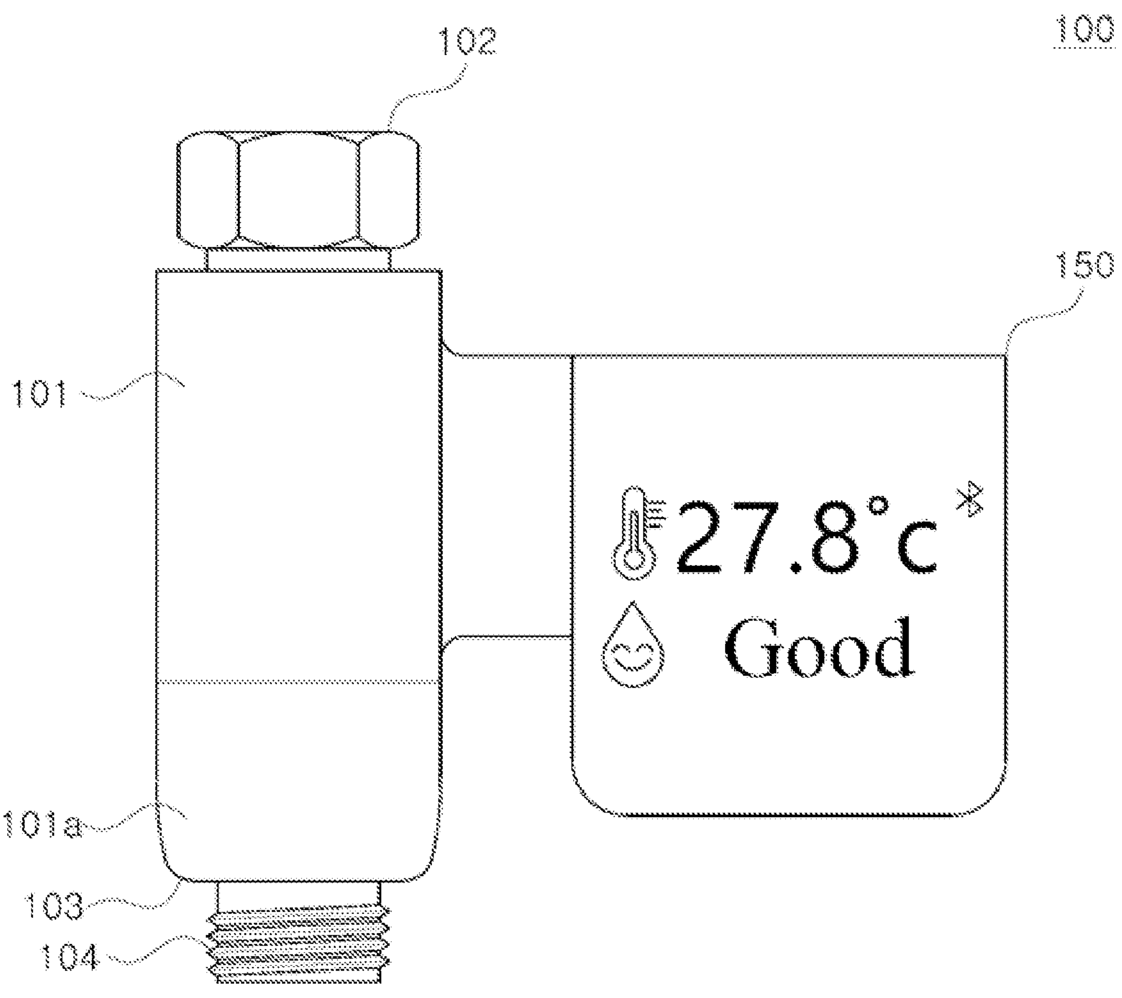
FIG. 5 is an exemplary display view of the household domestic water monitoring device according to the embodiment of the present disclosure.
Figure 6:
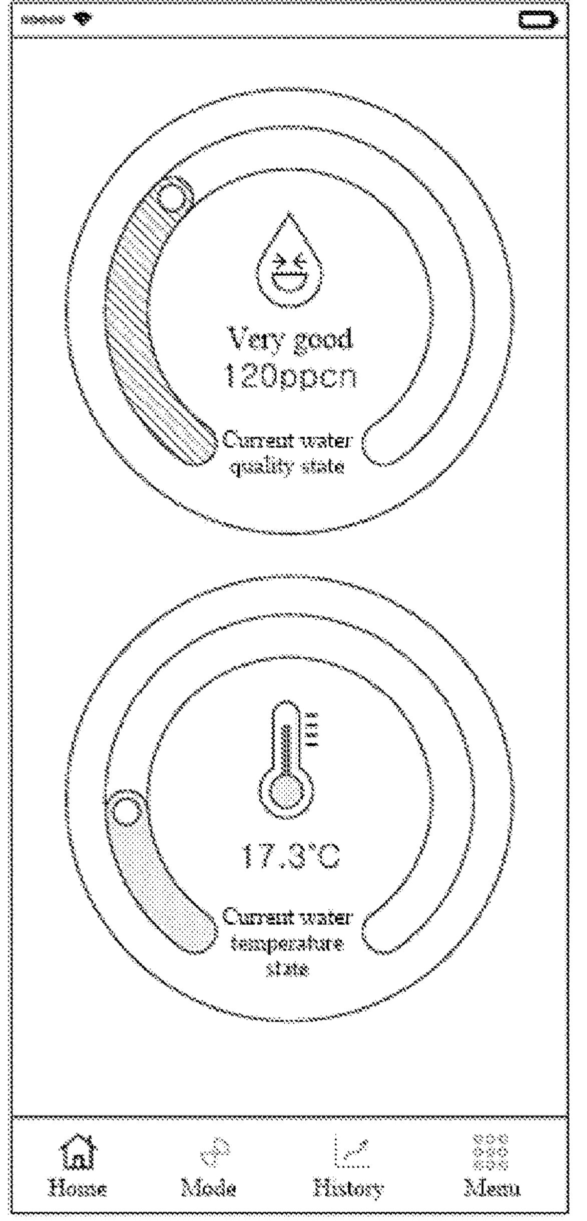
FIG. 6 is an exemplary display view of a user terminal according to the embodiment of the present disclosure.
Figure 6:
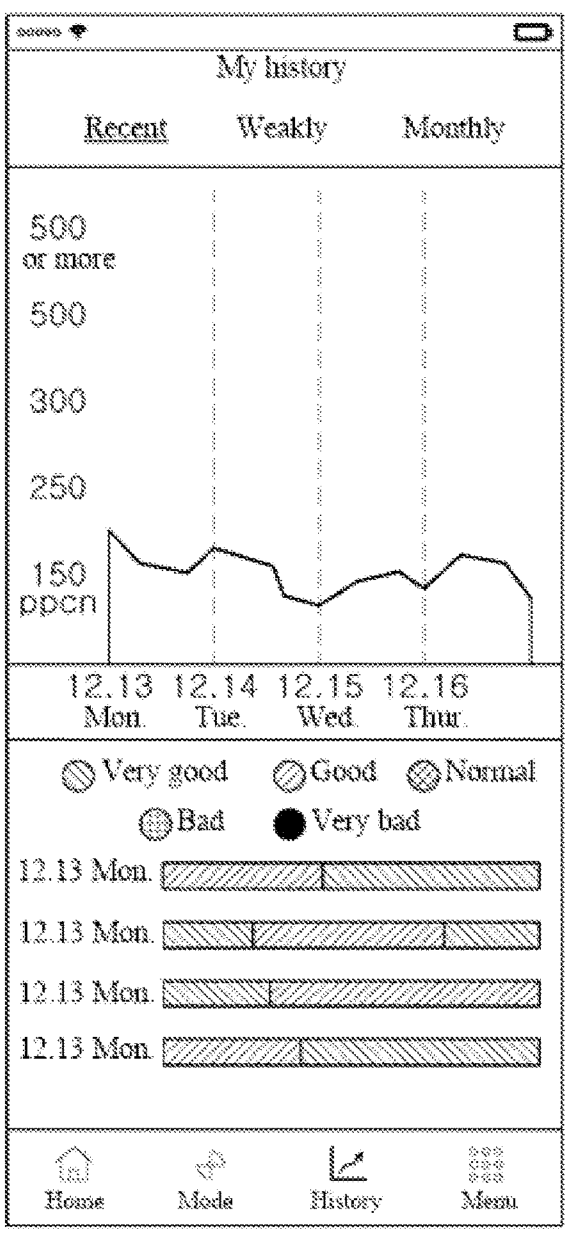

FIG. 1 is a block diagram for describing a household domestic water monitoring system according to an embodiment of the present disclosure, FIG. 2 is a block diagram of a household domestic water monitoring device according to the embodiment of the present disclosure, FIG. 3 is an exemplary view of a household domestic water monitoring device according to a first embodiment of the present disclosure, FIG. 4 is a block diagram of a measurement unit according to the embodiment of the present disclosure, FIG. 5 is an exemplary display view of the household domestic water monitoring device according to the embodiment of the present disclosure, and FIG. 6 is an exemplary display view of a user terminal according to the embodiment of the present disclosure.

As illustrated in FIG. 1, a household domestic water monitoring system 1 of the present disclosure may include a household domestic water monitoring device 100 that is connected to a faucet, measures a state of domestic water currently in use, and displays the state information, a user terminal 200 that is communication-connected to the household domestic water monitoring device 100, acquires the state information on the domestic water currently in use from the household domestic water monitoring device 100, and displays the state information and analysis information on the domestic water, and a server 300 that is communication-connected to the user terminal 200, receives the state information from the user terminal 200, stores the state information according to each user, and provides analysis information including information history saved according to each user to the user terminal 200.

Here, the household domestic water monitoring device 100 may measure the state of the domestic water including a water temperature and a water quality of the domestic water currently in use, may display information on the measured water temperature and the measured water quality on the household domestic water monitoring device 100, and may transmit the state information including the information on the measured water temperature and the measured water quality to the user terminal 200. Here, the information on the water quality is information on a water quality state and may include information on all measurement values of solids such as metals and ions such as calcium, magnesium, iron, and chlorine of the domestic water.

However, information on the domestic water collected from the household domestic water monitoring device 100 is not limited to the information on the water temperature and the information on the water quality, and as needed, information on a flow rate, a PH, and turbidity as the state information on the domestic water may be further collected.

Referring to FIG. 2, the household domestic water monitoring device 100 according to the embodiment may include a self-power generation unit 110, a communication unit 120, a measurement unit 130, a memory 140, and a display unit 150.

The self-power generation unit 110 may generate power by self-generating power by a fluid flow of the domestic water (tap water) supplied from the faucet. That is, when a user operates the faucet to allow the domestic water to flow into the household domestic water monitoring device 100 connected to the faucet through the faucet, power is generated while the flowing-into domestic water passes through the self-power generation unit 110. For example, the self-power generation unit 110 may include an impeller that is rotated by the fluid flow of the domestic water and a generator that generates power by a rotational force of the impeller. As an example, the household domestic water monitoring device 100 may include a vertical ultra-small self-power generating module that generates power between about alternating current (AC) 5 V and about AC 20 V, this is merely an embodiment, and the present disclosure is not limited thereto.

Prior to the description of the household domestic water monitoring device 100 according to the embodiment of the present disclosure, in various embodiments, in the first embodiment, components having the same configuration are representatively described using the same reference numerals, and in other embodiments, a configuration different from that of the first embodiment will be described.

Referring to FIG. 3, the household domestic water monitoring device 100 according to the first embodiment of the present disclosure includes a pipe part 101 through which the flowing-into domestic water passes when connected to the faucet, a faucet fastening part 102, which may be fastened to the faucet and through which the domestic water flows, is positioned at one end of the pipe part 101, and a discharge part 103 through which the domestic water is discharged is formed at the other end of the pipe part 101.

Meanwhile, a filter fastening part 104 that may be fastened to a filter case (not illustrated), which will be described below, is formed in the discharge part 103. That is, the household domestic water monitoring device 100 may have a configuration in which the faucet fastening part 102, the self-power generation unit 110, and the discharge part 103 are arranged in the pipe part 101 in this order, and the filter fastening part 104 may be formed in the discharge part 103. Thus, the domestic water flowing into the household domestic water monitoring device 100 is discharged to the outside from the household domestic water monitoring device 100 through the self-power generation unit 110. However, in the embodiment, the filter fastening part 104 may not be formed in the discharge part 103.

Meanwhile, the household domestic water monitoring device 100 according to the embodiment may include a configuration for maximizing the amount of power generated by the self-power generation unit 110. Therefore, the household domestic water monitoring device 100 according to the embodiment may secure a sufficient amount of power for smooth operation.

For example, in the embodiment, a plurality of through-holes (not illustrated), which will be described below, may be formed inside the faucet fastening part 102. In this case, while the domestic water flowing into the faucet fastening part 102 passes the plurality of through-holes (not illustrated) of the faucet fastening part 102, turbulence occurs and thus the domestic water flows to the self-power generation unit 110. Thereafter, as the turbulent domestic water passes through the self-power generation unit 110, a force for rotating the self-power generation unit 110 may increase, thereby maximizing the amount of power generated by the self-power generation unit 110.

In addition, the household domestic water monitoring device 100 according to the embodiment may include a configuration that allows the flowing-into domestic water to be quickly discharged from the household domestic water monitoring device 100 through the discharge part 103.

In the embodiment, a width of the pipe part 101 in an area adjacent to the discharge part 103 may be relatively narrow as compared to a width of the pipe part 101 not adjacent to the discharge part 103. In this case, the pipe part 101 in the area adjacent to the discharge part 103 may be defined as a laminar flow portion 101*a*.

In another embodiment, a cross-sectional area of the pipe part 101 in the area adjacent to the discharge part 103 may decrease as the pipe part 101 approaches the discharge part 103.

In still another embodiment, a diameter of the pipe part 101 in the area adjacent to the discharge part 103 may decrease as the pipe part 101 approaches the discharge part 103.

Thus, while the domestic water flowing into the pipe part 101 passes through the area adjacent to the discharge part 103, a laminar flow occurs, and thus a flow rate of the domestic water in the pipe part 101 increases. As a result, movement of the domestic water in the pipe part 101 becomes smooth, so that the amount of power generated by the self-power generation unit 110 may be maximized.

The communication unit 120 may include a low-power short-distance communication module that may be operated with power generated by self-generation to communication-connect the household domestic water monitoring device 100 and the user terminal 200 to each other.

The household domestic water monitoring device 100 does not receive power from an external unit or does not use a battery and is driven by power generated by supplying the tap water to the self-power generation unit 110 through the faucet. Thus, the communication unit 120 supports low-power short-distance communication, serves as a processor or controller of the household domestic water monitoring device 100 in addition to the communication role, and thus contributes to minimizing use of power. That is, the low-power short-distance communication module also serves as the processor of the household domestic water monitoring device 100 in addition to the communication role.

As an example, the communication unit 120 may include a Bluetooth low energy (BLE) communication module. However, the communication unit 120 is not limited as long as the communication unit 120 may support the low-power short-distance communication and serve as the processor. For example, the communication unit 120 may support the short-distance communication using at least one of WiFi HaLow, LoRa, Bluetooth™, radio frequency identification (RFID), infrared data association (IrDA), ultra wideband (UWB), ZigBee, near field communication (NFC), Wi-Fi, Wi-Fi Direct, and wireless Universal Serial Bus (USB).

In addition, since a matter standard may be applied to the communication unit 120, the household domestic water monitoring device 100 may be more easily linked to various Internet of Thing (IoT) platforms.

As described above, the communication unit 120 may serve as the processor of the household domestic water monitoring device 100, and the measurement unit 130, the memory 140, and the display unit 150 may be controlled by the communication unit 120.

Referring to FIG. 2, the communication unit 120 is directly connected to the self-power generation unit 110 and receives power first. Components other than the communication unit 120 are connected to the self-power generation unit 110 through the communication unit 120 and receive power.

Thus, when the domestic water flows into the household domestic water monitoring device 100 and the power is generated through the self-power generation unit 110, the communication unit 120 may first operate to communication-connect the household domestic water monitoring device 100 and the user terminal 200. Therefore, the user may identify the state information and the analysis information on the domestic water by the household domestic water monitoring device 100 through the user terminal 200, thereby improving user satisfaction.

Meanwhile, the communication unit 120 may implement a timer in a software manner while serving as the processor. That is, a real time clock (RTC) may be implemented by the communication unit 120, and therefore, the household domestic water monitoring device 100 may transmit the state information on the domestic water together with time information to the user terminal 200 or store the state information on the domestic water together with the time information in the memory 140.

The measurement unit 130 may measure the state information on the domestic water flowing into the household domestic water monitoring device 100.

Referring to FIG. 4, the measurement unit 130 may include a temperature sensor 131 that measures a water temperature of the domestic water currently in use, a total dissolved solid (TDS) sensor 132 that measures water quality of the domestic water currently in use, a flow rate sensor 133 that measures a flow rate of the domestic water currently in use, a PH sensor 134 that measures a PH of the domestic water currently in use, and a turbidity sensor 135 that measures a turbidity of the domestic water currently in use. In the embodiment, the measurement unit 130 may not include the flow rate sensor 133.

The household domestic water monitoring device 100 may include the memory 140, and the memory 140 may be, for example, an electrically erasable and programmable read only memory (EEPROM) as a non-volatile memory device, but the present disclosure is not limited thereto.

The state information measured by the measurement unit 130 together with the time information generated by the communication unit 120 may be transmitted to the user terminal 200 or stored in the memory 140. Thus, even when there is the state information that is not transmitted to the user terminal 200 because the household domestic water monitoring device 100 is not communication-connected to the user terminal 200, the communication unit 120 may transmit, to the user terminal 200, the not-transmitted state information together with the time information when the household domestic water monitoring device 100 is communication-connected to the user terminal 200, and thus ensures that there is no transmission omission of the measured state information.

Meanwhile, in the household domestic water monitoring device 100, the measurement unit 130 measures the domestic water that is not purified by a filter. That is, since the measurement unit 130 measures the state information on the domestic water flowing from the faucet, when the household domestic water monitoring device 100 according to the embodiment of the present disclosure is used, the state information on the domestic water flowing into the home may be identified.

In the embodiment, even when the measurement unit 130 does not include the flow rate sensor 133, the flow rate may be calculated in another manner.

For example, the communication unit 120 may calculate a real-time flow rate of a fluid passing through the pipe part 101 by calculating a flow rate of the fluid passing through the pipe part 101 based on a voltage value of the power generated by the self-power generation unit 110 and then multiplying an inner diameter of the pipe part 101 by the value obtained by calculating the flow rate of the fluid passing through the pipe part 101. To this end, the self-power generation unit 110 or the measurement unit 130 may include a voltage measuring module (not illustrated) that measures the voltage value generated by the self-power generation unit 110.

However, the communication unit 120 is operated by power supplied from the self-power generation unit 110. Thus, as in a case in which the water supply is weak, when the voltage of power generated by the self-power generation unit 110 is smaller than a voltage at which the communication unit 120 may operate, the flow rate may not be measured.

The communication unit 120 may transmit real-time flow rate information obtained by measuring a real-time flow rate of the fluid passing through the pipe part 101 to the server 300, which will be described below. The flow rate information may be transmitted from the communication unit 120 via the user terminal 200 to the server 300, but in some embodiments, the flow rate information may be transmitted from the communication unit 120 to the server 300.

Thereafter, the server 300 may store real-time flow rate information received from the communication unit 120, may store cumulative flow rate information obtained by cumulating the stored information and calculating a cumulative flow rate of the fluid passing through the pipe part 101 and transmit the cumulative flow rate information to the household domestic water monitoring device 100 or the user terminal 200.

The display unit 150 may display the real-time flow rate information or the cumulative flow rate information. For example, a flow unit of the real-time flow rate information and a flow unit of the cumulative flow rate information may be at least one of L/d, L/h, L/min, L/s, mL/d, mL/h, mL/min, mL/s, gal(US)/d, gal(US)/h, gal(US)/min, gal(US)/s, kbbl (US)/d, bbl(US)/d, bbl(US)/h, bbl(US)/min, bbl(US)/s, oz/h, oz/min, and oz/s.

Referring to FIG. 5, the display unit 150 may display the state information including the information on the water temperature and the information on the water quality, the water temperature and the water quality being measured by the measurement unit 130. The state information on the domestic water displayed on the display unit 150 may display a measurement value measured by the measurement unit 130 without change.

However, in the embodiment, the communication unit 120 may calculate the analysis information by comparing the measurement value measured by the measurement unit 130 and a reference table value stored in advance in the memory 140, and the display unit 150 may display the analysis information.

For example, since it is difficult for the user to intuitively understand a measurement value of the information on the water quality measured by the TDS sensor 132, a measurement value obtained by the PH sensor 134, and a measurement value obtained by the turbidity sensor 135, the communication unit 120 may calculate a suitability level for a state of the water quality by comparing the measurement value measured by the measurement unit 130 with the reference table value stored in advance in the memory 140 and may control the display unit 150 to display the calculated suitability level.

The suitability level may be classified into several levels such as very good, good, normal, bad, and very bad, and as illustrated in FIG. 5, the analysis information on the state of the water quality may be displayed on the display unit 150 as "good" to help the intuitive understanding of the user.

In addition, the display unit 150 may include a gyro sensor (not illustrated). Thus, the display unit 150 may adjust a display output direction so that the user may easily read the displayed information based on information on a direction in which the display unit 150 is installed. For example, the display unit 150 may output the state information or the analysis information in a horizontal direction or a vertical direction according to whether the display unit 150 is installed perpendicular to the ground or is installed parallel to the ground, based on the information on the direction collected by the gyro sensor (not illustrated).

The user terminal 200 may include all standing devices such as personal computers (PC), network televisions (TVs), hybrid broadcast broadband TVs, smart TVs, and Internet protocol TVs (IPTVs) and mobile device or handheld device such as smart phones, tablet PCs, laptops, and personal digital assistants.

Next, a network that connects the user terminal 200 and the server 300 includes both wired and wireless networks and is collectively called a communication network that supports various communication standards or protocols for paring and/or data transmission and reception between the user terminal 200 and the server 300.

These wired/wireless networks may include all communication networks that are supported currently or in the future according to a standard and may support all one or more communication protocols therefor.

For example, the wired/wireless network may be formed by a network for wired connection, such as a universal serial bus (USB), a composite video banking sync (CVBCS), a component, a S-video (analog), a digital visual interface (DVI), a high definition multimedia interface (HDMI), an RGB, and a D-SUB, communication standards or protocols therefor, a network for wireless connection, such as Bluetooth, a radio frequency identification (RFID), an infrared data association (IrDA), a ultra wideband (UWB), a ZigBee, a digital living network alliance (DLNA), a wireless local area network (WLAN), Wi-Fi, a wireless broadband (Wibro), a world interoperability for microwave access (Wimax), a high speed downlink packet access (HSDPA), a Long Term Evolution/LTE-Advanced (LTE/LTE-A), and a Wi-Fi direct, and communication standards or protocols therefor.

Next, the user terminal 200 may be communication-connected to the household domestic water monitoring device 100 and the server 300, may acquire the state information and the time information on the domestic water currently in use from the household domestic water monitoring device 100, may display least one of the information on the water temperature, the information on the water quality, the information on the flow rate, the information on the PH, and the information on the turbidity included in the acquired state information, may transmit the acquired state information and the acquired time information to the server 300, and may receive analysis information on the user and a domestic water-related use information history from the server 300.

For example, referring to FIG. 6, the user terminal 200 may output the state information including the information on the water temperature and the information on the water quality, and the information on the water quality may be displayed in the suitability level instead of the measurement value. Further, the user terminal 200 may display the analysis information and the domestic water-related use information history in a time series manner.

In addition, the user terminal 200 may receive, from the user, input of a date on which the filter case (not illustrated) is coupled to the household domestic water monitoring device 100, and the user terminal 200 may provide, to the server 300, information on a first use date of the filter (not illustrated) accommodated in the filter case. The server 300 may calculate a cumulated use time of the filter using the time information collected from the household domestic water monitoring device 100, may determine that replacement of the filter is required when the cumulated use time of the filter is greater than a preset reference time, and may provide alarm information on the need for replacement of the filter to the user terminal 200.

In the embodiment, when the server 300 determines the need for replacement of the filter, the state information may be further considered as well as information on the cumulated use time of the filter. For example, the server 300 may further consider the information on the water quality of the domestic water together with the time information collected from the household domestic water monitoring device 100.

For example, even when the cumulated use time of the filter is the same, the server 300 may determine the need for replacement of the filter differently according to the information on the water quality of the domestic water, and when the water quality is not good according to the information on the water quality of the domestic water, that is, the measurement value obtained by the TDS sensor 132 is high, the server 300 may determine that the need for replacement of the filter is high.

The user terminal 200 may output the alarm information indicating the need for replacement of the filter to the user and may transmit, to the server 300, a purchase instruction command signal for a filter purchase approval request signal when receiving the filter purchase approval request signal from the user.

Accordingly, the server 300 may be connected to a server (not illustrated) of an external filter vendor to request purchase of the filter.

In the embodiment, the server 300 may calculate the use amount of the domestic water according to at least one of a time, a day, a month, and a year based on the information on the measured flow rate and the time information measured from the timer and may transmit the information on the calculated use amount to the user terminal 200. Here, when transmitting the information on the calculated use amount to the user terminal 200, the server 300 may transmit the information on the use amount for each preset period or transmit the information on the use amount whenever the use amount of a predetermined period is calculated.

In the embodiment, according to the present disclosure, the server 300 may store, in the memory 140, each filter recommendation information indicating the type of filter most suitable for each temperature, each water quality, and each water use amount of different domestic waters. In this case, when the temperature, the water quality, and the water use amount of specific domestic water is measured through the measurement unit 130, the server 300 may search the memory 140 for the filter recommendation information corresponding to the measured temperature, the measured water quality, and the measured water use amount, may output the searched filter recommendation information onto the display unit 150, and thus may recommend the user for the type of filter most suitable for the current state of the domestic water. Here, the type of filter may include a membrane filter, a carbon filter, a composite filter, a sponge filter, and a hollow fiber membrane filter.

Next, when it is determined that the domestic water is used while the user is absent, the server 300 may provide a warning alarm notifying that there is an abnormality in use of the domestic water, or when it is determined that the domestic water is not used for a predetermined period of time while the user is at home, the server 300 may provide a warning alarm notifying that there is an abnormality in non-use of the domestic water to the user terminal 200.

Here, the server 300 may determine whether the user is absent, may determine whether the domestic water is used when the user is absent, and may notify the user terminal 200 that there is an abnormality in the use of the domestic water when the domestic water is in use.

In some cases, the server 300 may determine whether the user is absent, may determine whether the domestic water is used for a predetermined period of time when the user is present, and may notify the user terminal 200 that there is an abnormality in the non-use of the domestic water when the domestic water is not used for a predetermined period of time.

Meanwhile, the server 300 is communication-connected to the user terminal 200, and when receiving the state information on the domestic water from the user terminal 200, the server 300 may store the state information on the domestic water for each user and may transmit the domestic water-related use information history based on the stored state information on the domestic water for each user to the user terminal 200.

Here, when transmitting the domestic water-related use information history to the user terminal 200, the server 300 may transmit the domestic water-related use information history according to each preset period to the user terminal 200, or whenever receiving a history information request from the user terminal 200, the server 300 may transmit the domestic water-related use information history corresponding thereto to the user terminal 200.

In this way, the present disclosure may provide, to the user, various pieces of the state information such as the information on the water temperature, the information on the water quality, the information on the flow rate, the information on the PH, and the information on the turbidity of the household domestic water currently in use in real time, may provide a state information history for the household domestic water for a certain period of time to each user, and thus may improve user convenience.

Further, the present disclosure may provide, to the user, the state information on the domestic water purified by the filter and information on a filter replacement time in real time, may automatically purchase the filter, and thus may improve user convenience.

Further, the present disclosure may notify that there is an abnormality in the use of the domestic water when it is determined that the domestic water is used while the user is absent, may notify that there is an abnormality in the non-use of the domestic water when it is determined that the domestic water is not used for a predetermined period of time while the user is at home, and thus may provide alarm information such as social elderly management, water unlocking due to mistake, and water leakage due to faucet failure.

Figure 7:
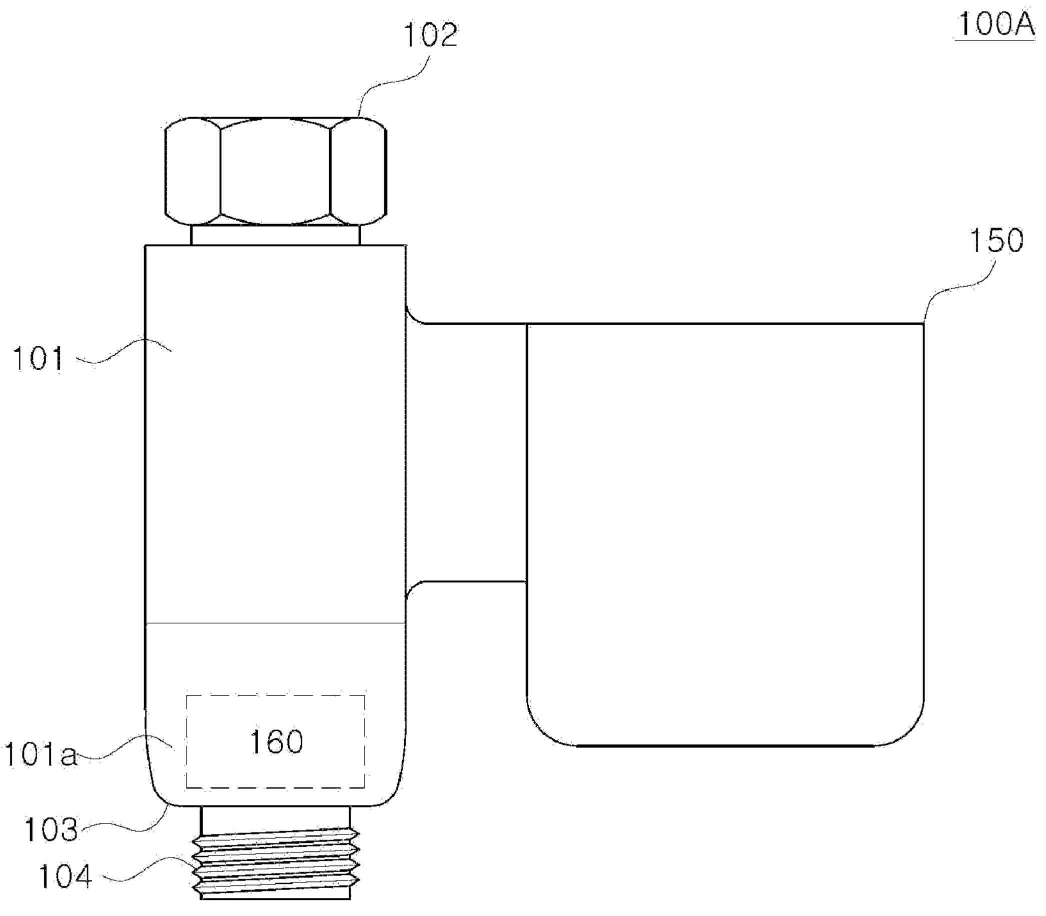
FIG. 7 is a front view of a household domestic water monitoring device according to a second embodiment of the present disclosure.

FIG. 7 is an exemplary view of a household domestic water monitoring device according to a second embodiment of the present disclosure.

Referring to FIG. 7, unlike the first embodiment, a household domestic water monitoring device 100A according to the second embodiment of the present disclosure may further include a sterilization unit 160, and the sterilization unit 160 may be positioned adjacent to the filter fastening part 104.

The sterilization unit 160 may operate by receiving power from the self-power generation unit 110, for example, the sterilization unit 160 may include an ultraviolet (UV) lamp, but the present disclosure is not limited thereto. The sterilization unit 160 sterilizes the filter (not illustrated) accommodated in the filter case (not illustrated) fastened to the filter fastening part 104 and thus prevents the domestic water from being polluted by a polluted filter.

Figure 8:
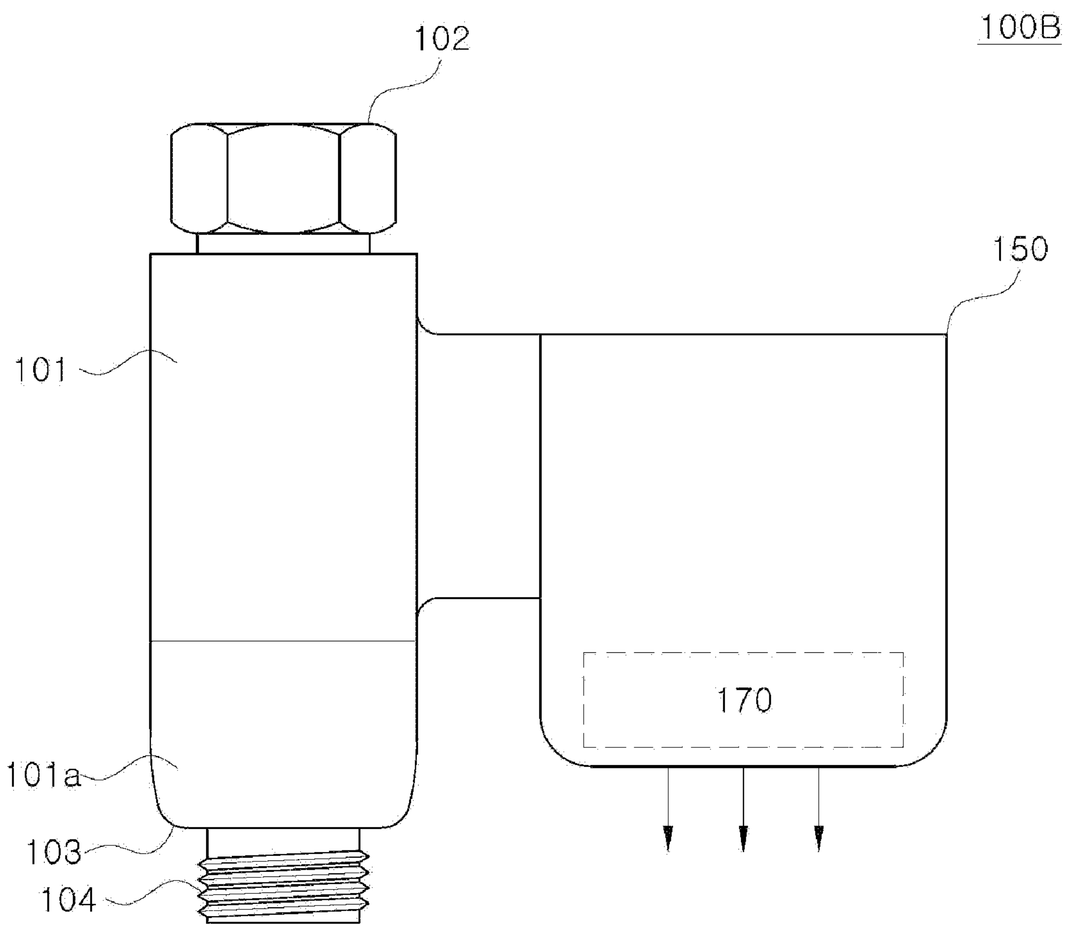
FIG. 8 is a front view of a household domestic water monitoring device according to a third embodiment of the present disclosure.

FIG. 8 is an exemplary view of a household domestic water monitoring device according to a third embodiment of the present disclosure.

Referring to FIG. 8, unlike the first embodiment, a household domestic water monitoring device 100B according to the third embodiment of the present disclosure may further include a distance measuring device 170. For example, the distance measuring device 170 may be positioned at a lower end of the display unit 150 and may include an infrared sensor, but the present disclosure is not limited thereto.

The distance measuring device 170 may measure a distance from a lower end of the display unit 150 to water filled in a bottom of a bathtub or a bottom of a sink. When the user operates the faucet to fill the bathtub or the sink with water, the distance measuring device 170 continuously measures the distance, and as the water level increases, the size of the measurement value obtained by the distance measuring device 170 gradually decreases. The communication unit 120 may compare the measurement value obtained by the distance measuring device 170 with a reference value stored in advance in the memory 140 and may provide an alarm to the user terminal 200 when the measurement value corresponds to the reference value.

Therefore, the user may identify that the bathtub or the sink is filled with water as much as desired, and an effort of frequently identifying the water level to prevent the water from overflowing in the bathtub or the sink may be reduced.

Figure 9:
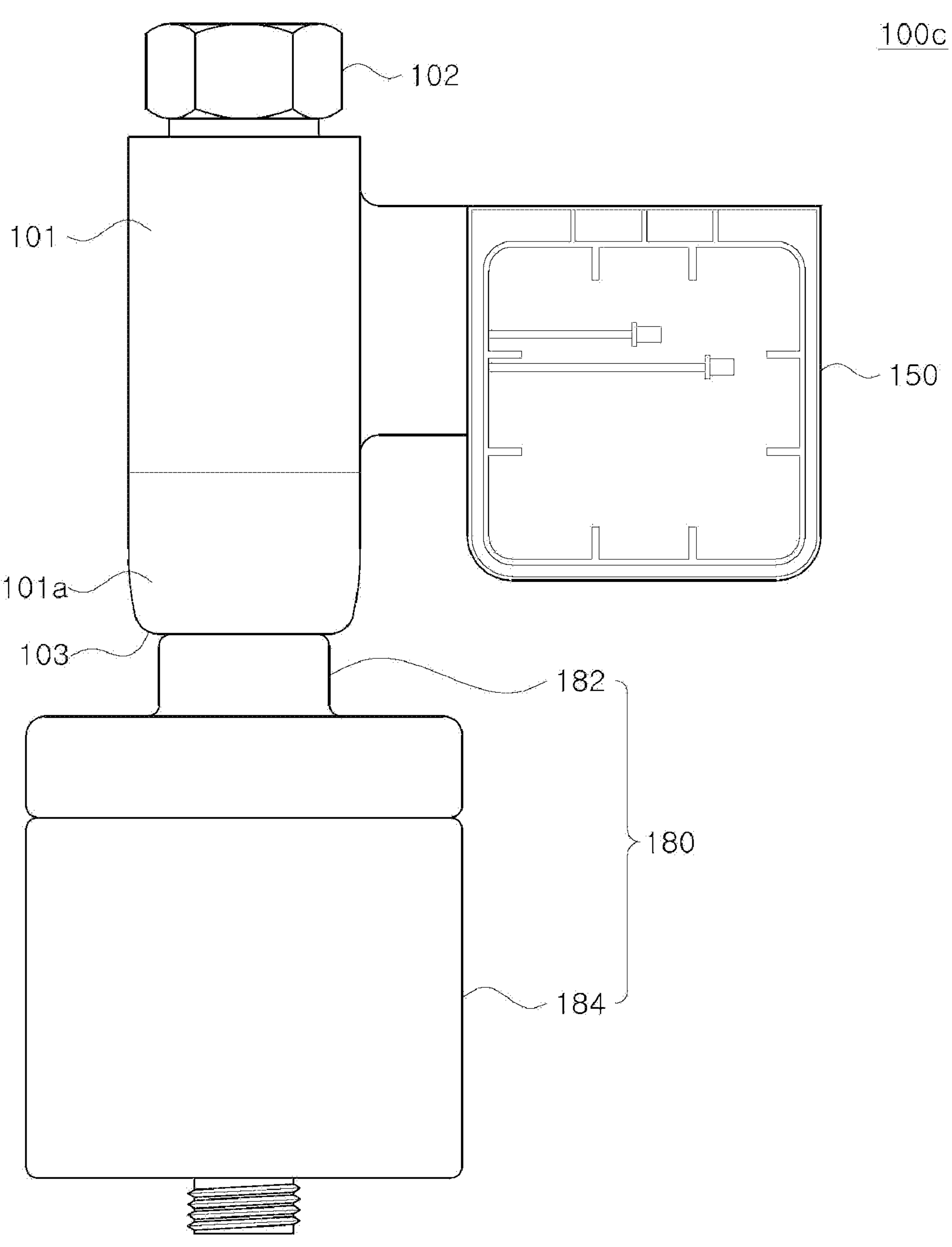
FIG. 9 is a front view of a household domestic water monitoring device according to a fourth embodiment of the present disclosure.
Figure 10:
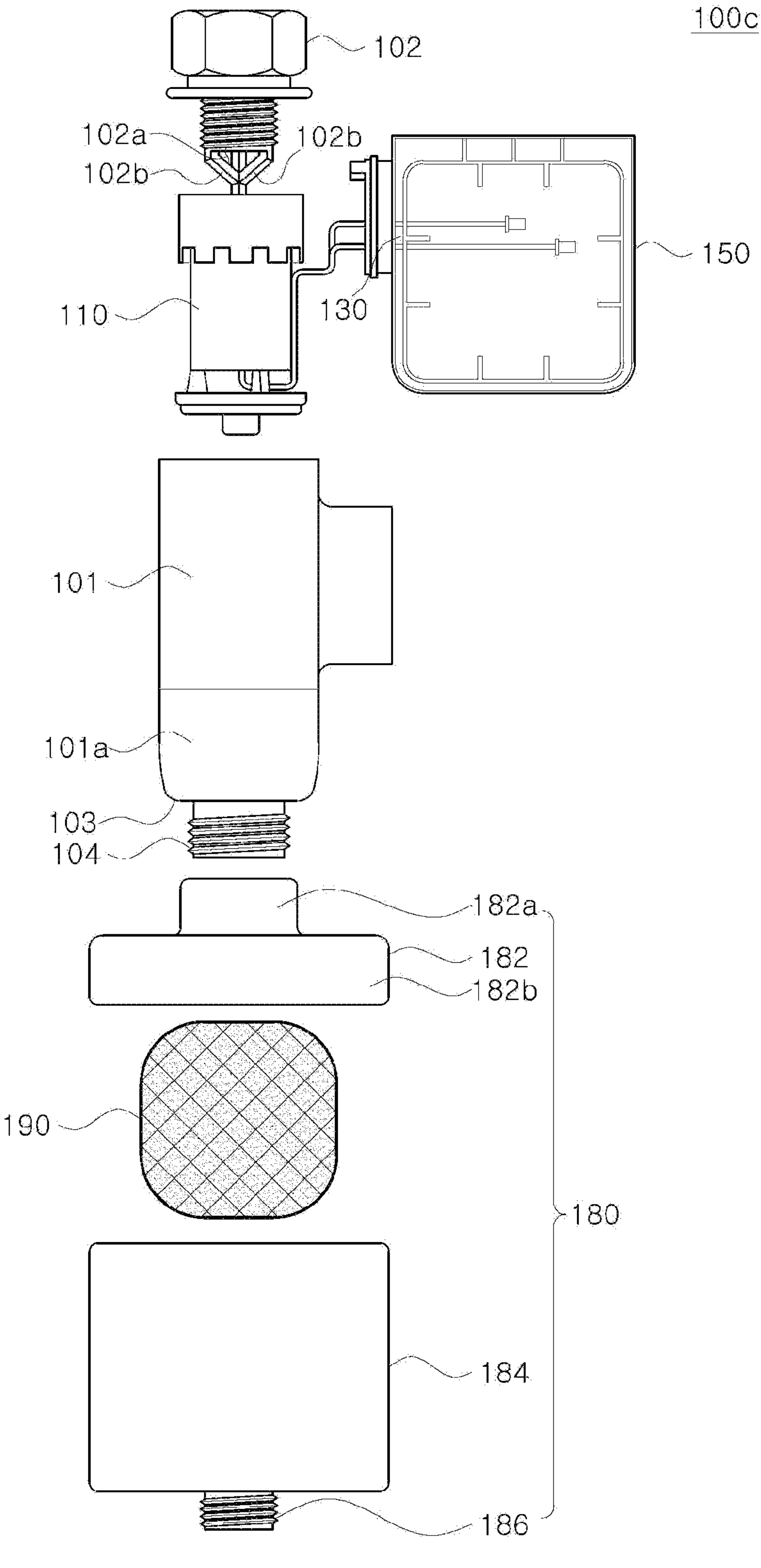
FIG. 10 is an exploded view of the household domestic water monitoring device according to the fourth embodiment of the present disclosure.
Figure 11:
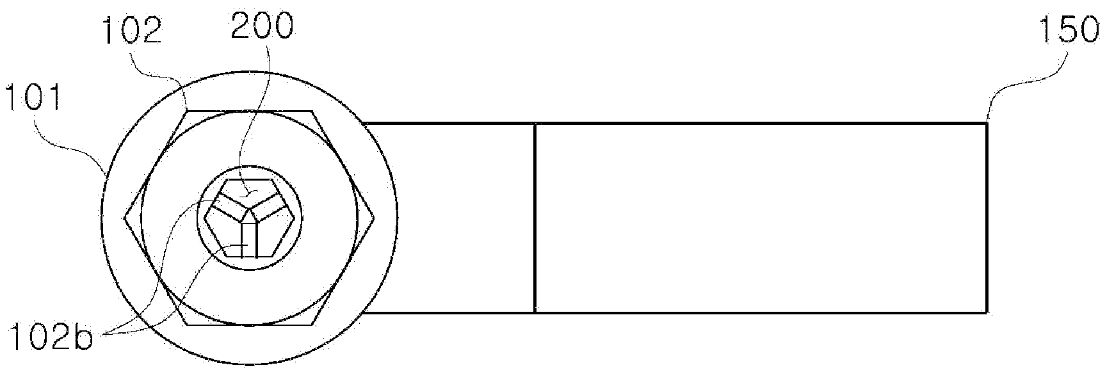
FIG. 11 is a plan view of the household domestic water monitoring device according to the fourth embodiment of the present disclosure.

FIG. 9 is a front view of a household domestic water monitoring device according to a fourth embodiment of the present disclosure, FIG. 10 is an exploded view of the household domestic water monitoring device according to the fourth embodiment of the present disclosure, and FIG. 11 is a plan view of the household domestic water monitoring device according to the fourth embodiment of the present disclosure.

As illustrated in FIGS. 9 and 10, unlike the first embodiment, a household domestic water monitoring device 100C according to the fourth embodiment of the present disclosure may further include a filter case 180 and a filter 190.

In the present embodiment, the filter case 180 and the filter 190 may be external.

The filter case 180 may be detachably fastened to the filter fastening part 104 protruding from the discharge part 103 and may serve to accommodate the filter 190. The filter case 180 may include a filter lid 182 and a filter container 184.

The filter lid 182 may serve to connect the filter fastening part 104 and the filter container 184. A first screw hole 182*a* that is screw-coupled to the filter fastening part 104 may be formed on one side of the filter lid 182. Further, a second screw hole 182*b* that is screw-coupled to the filter container 184 may be formed on the other side of the filter lid 182. Here, the one side of the filter lid 182 may be an upper side of the filter lid 182, and the other side of the filter lid 182 may be a lower side of the filter lid 182.

The filter 190 may be accommodated in the filter container 184. A screw thread that is screw-coupled to the second screw hole 182*b* of the filter lid 182 may be formed on one side of the filter container 184. Further, an outlet 186, through which the domestic water filtered through the filter 190 is discharged, may be formed on the other side of the filter container 184.

In the embodiment, the filter case 180 and the filter lid 182 may have a cylindrical shape.

In the present embodiment, as illustrated in FIGS. 10 and 11, an interior of the faucet fastening part 102 may be hollow. Further, a plurality of partition walls 102*b* forming a plurality of through-holes 102*a* may be provided inside the faucet fastening part 102.

The plurality of partition walls 102*b* may have a shape extending radially from a central axis of the faucet fastening part 102, and the through-hole 102*a* may be formed between the two adjacent partition walls 102*b*.

The plurality of through-holes 102*a* may be formed at intervals in a circumferential direction inside the faucet fastening part 102, and the partition wall 102*b* may be disposed between the two adjacent through-holes 102*a*.

In the present embodiment, the domestic water passing through the faucet fastening part 102 collides with the plurality of partition walls 102*b* and branches into the through-holes 102*a*, and thus turbulence is generated. Thereafter, the turbulent domestic water flows into the self-power generation unit 110. As a result, as a force for rotating the self-power generation unit 110 increases while the turbulent domestic water passes through the self-power generation unit 110, the amount of power generated by the self-power generation unit 110 may be maximized.

Figure 12:
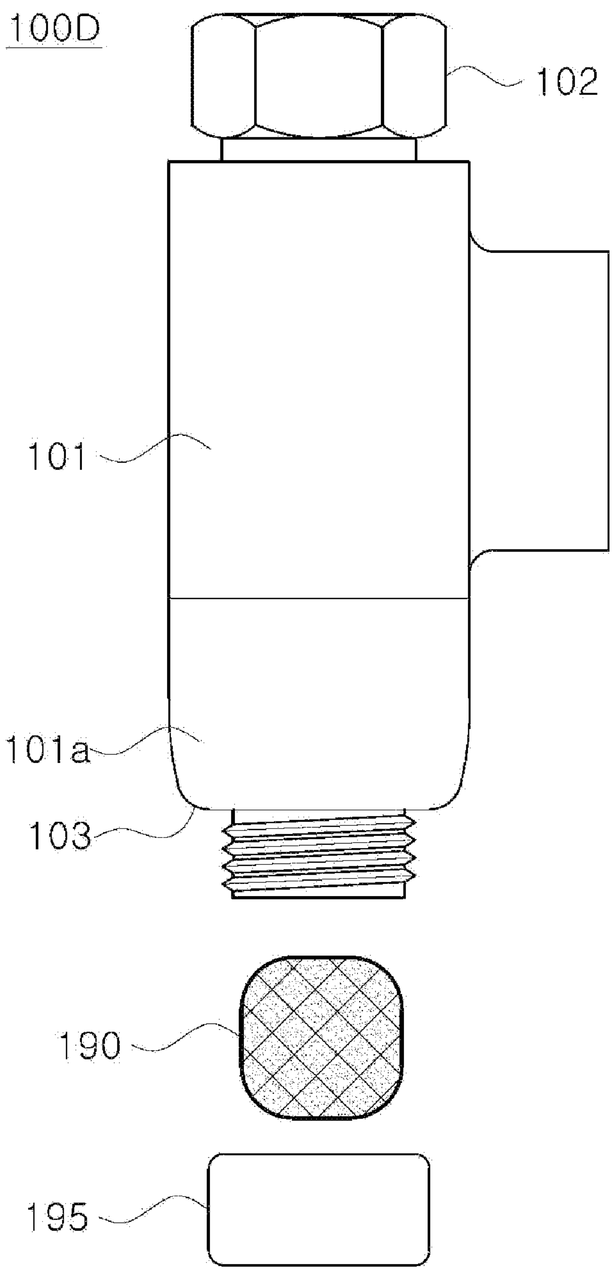
FIG. 12 is a front view of a household domestic water monitoring device according to a fifth embodiment of the present disclosure.

FIG. 12 is a front view of a household domestic water monitoring device according to a fifth embodiment of the present disclosure.

As illustrated in FIG. 12, unlike the fourth embodiment, a household domestic water monitoring device 100D according to the fifth embodiment of the present disclosure excludes the filter case and the display unit.

Thus, the household domestic water monitoring device 100D according to the present embodiment may have an overall compact structure.

In the present embodiment, the measurement unit 130 and the filter 190 may be accommodated in the pipe part 101.

Further, after the filter 190 is accommodated in the pipe part 101, the filter 190 may be prevented from being separated from the pipe part 101 by a filter cover 195 screw-coupled to the discharge part 103.

Meanwhile, in the embodiment, the reference value stored in advance in the memory 140 may be determined by the user. To this end, the user may input the reference value for determining the water level of the bathtub or the sink through the user terminal 200, the user terminal 200 may transmit the reference value input to the household domestic water monitoring device 100D, and the transmitted reference value may be stored in the memory 140.

Further, the communication unit 120 may compare the measurement value obtained by the distance measuring device 170 with the reference value stored in advance in the memory 140 and may provide an alarm to the user terminal 200 when the measurement value corresponds to the reference value.

Hereinabove, the method according to the embodiment of the present disclosure may be implemented in a program (or an application) to be executed in conjunction with a server that is hardware and may be stored in a medium.

The above-described program may include a code coded in a computer language such as C, C++, JAVA, or a machine language that may be read by a processor CPU of a computer through a device interface of the computer in order for the computer to read the program and execute the method implemented in the program. This code may include a functional code related to functions or the like that define necessary functions that execute the methods and may include an execution procedure-related control code required for the processor of the computer to execute the functions according to a predetermined procedure. Further, the code may further include a memory reference-related code indicating whether additional information or media required for the processor of the computer to execute the functions should be referenced from an interior of the computer or any position (address) of an external memory. Further, when the processor of the computer needs to communicate with another computer or server in a remote mode to execute the functions, the code may further include a communication-related code indicating how to communicate with another computer or server in a remote mode or which information or media should be transmitted or received during the communication using a communication module of the computer.

The storage medium refers to a medium that semi-permanently stores data and is readable by a device rather than a medium that stores data for a short period of time, such as a register, a cache, and a memory. In detail, examples of the storage medium include a read-only memory (ROM), a random-access memory (RAM), a compact disc read-only memory (CD-ROM), a magnetic tape, a floppy disk, an optical data storage device, or the like, but the present disclosure is not limited thereto. That is, the program may be stored in various recording media on various servers to which the computer may be connected or various recording media on the computer of the user. Further, the medium may be distributed to a computer system connected to a network, and a computer-readable code may be stored in the medium in a distributed manner.

Operations of a method or algorithm described in connection with the embodiments of the present disclosure may be directly implemented in hardware, may be implemented in a software module executed by the hardware, or may be implemented in a combination thereof. The software module may reside on the RAM, the ROM, an erasable programmable ROM (EPROM), an electrically erasable programmable ROM (EEPROM), a flash memory, a hard disk, a removable disk, the CD-ROM, and a computer-readable recording medium having an arbitrary form, which is widely known in the art to which the present disclosure pertains.

As described above, according to the present disclosure, various pieces of state information on household domestic water currently in use, such as a flow rate, water quality and a water temperature, may be provided to a user in real time, a state information history for the household domestic water may be provided to each user for a certain period of time, and thus user convenience may be improved.

Further, the present disclosure may provide, to the user, the state information on the domestic water purified by the filter and information on a filter replacement time in real time, may automatically purchase the filter, and thus may improve user convenience.

Further, the present disclosure may notify that there is an abnormality in the use of the domestic water when it is determined that the domestic water is used while the user is absent, may notify that there is an abnormality in the non-use of the domestic water when it is determined that the domestic water is not used for a predetermined period of time while the user is at home, and thus may provide alarm information such as social elderly management, water unlocking due to mistake, and water leakage due to faucet failure.

The effects of the present disclosure are not limited to the effects described above, and those skilled in the art will clearly understand non-mentioned other effects not described from the following description.

Hereinabove, embodiments of the present disclosure have been described with reference to the accompanying drawings. However, those skilled in the art to which the present disclosure pertains may understand that the present disclosure may be implemented in other specific forms without changing the technical spirit or essential features thereof. Therefore, it should be understood that the embodiments described above are illustrative but not limiting in all aspects.

What is claimed is:

1. A household domestic water monitoring device connected to a faucet and configured to measure a state of domestic water currently in use, the household domestic water monitoring device comprising:

a faucet fastening part for connection to the faucet;

a self-power generation unit configured to generate power by self-generating power by a fluid flow of the domestic water, the self-power generation unit supplying the power to the household domestic water monitoring device;

a pipe part through which the domestic water flows in or flows out, the faucet fastening part being positioned at one end of the pipe part, a discharge part through which the domestic water is discharged being formed at the other end of the pipe part, and the domestic water flowing into the pipe part through the faucet fastening part being discharged from the pipe part through the discharge part via the self-power generation unit;

a communication unit configured to support low-power short-distance communication and control an operation of the household domestic water monitoring device, the communication unit operating by first receiving the power from the self-power generation unit when the self-power generation unit generates the power;

a measurement unit configured to measure a water temperature and water quality of the domestic water currently in use;

a memory configured to store state information on the domestic water measured by the measurement unit; and a display unit configured to display the state information, wherein the communication unit transmits the state information on the domestic water to a user terminal connected through the low-power short-distance communication, and the display unit operates after the communication unit operates first, wherein a plurality of through-holes are formed in the faucet fastening part such that the domestic water flowing into the pipe part generates turbulence, and the turbulent domestic water generated through the plurality of through-holes is supplied to the self-power generation unit, and wherein a width of the pipe part in an area adjacent to the discharge part is relatively smaller than a width of the pipe part in an area not adjacent to the discharge part such that a laminar flows occurs in the domestic water flowing in the pipe part and thus a flow rate of the domestic water flowing in the pipe part increases.

2. The household domestic water monitoring device of claim 1, wherein the measurement unit includes:

a temperature sensor configured to measure the water temperature of the domestic water currently in use; and a total dissolved solid (TDS) sensor configured to measure the water quality of the domestic water currently in use, wherein the communication unit is configured to:

calculate a suitability level for the water quality of the domestic water by comparing a measurement value for information on the water quality with a reference table value, when the measurement value including the information on the water quality is acquired from the measurement unit; and control the display unit to display the calculated suitability level for the information on the water quality and display the measurement value for information on the water temperature.

3. The household domestic water monitoring device of claim 2, wherein, when communication between the household domestic water monitoring device and the user terminal is disconnected and then reconnected, the communication unit transmits, to the user terminal, the state information on the domestic water measured by the measurement unit and stored in the memory while the communication between the household domestic water monitoring device and the user terminal is disconnected.

4. The household domestic water monitoring device of claim 1, wherein a filter fastening part to which a filter is fastened is formed in the discharge part, and the measurement unit measures the water temperature and the water quality of the domestic water that is not filtered.

5. The household domestic water monitoring device of claim 4, further comprising:

a sterilization unit formed adjacent to the filter fastening part, wherein the sterilization unit sterilizes the filter fastened to the filter fastening part.

6. A household domestic water monitoring system comprising:

the household domestic water monitoring device of claim 4, further comprising a filter communication-connected to the user terminal, configured to transmit the state information on the domestic water and time information on a measurement time, and fastened to the filter fastening part; and a server configured to receive the state information on the domestic water and the time information on the measurement time from the user terminal and to provide analysis information including an information history stored for each user to the user terminal, wherein the server receives information on a first use date of the filter input to the user terminal from the user terminal, calculates a cumulated use time of the filter using the time information collected by the household domestic water monitoring device, and provides alarm information on filter replacement to the user terminal when the cumulated use time is greater than a predetermined reference time.

7. The household domestic water monitoring device of claim 1, further comprising:

a distance measuring device configured to measure a distance from the household domestic water monitoring device to water when the household domestic water monitoring device is fastened to the faucet, wherein the communication unit compares the measurement value obtained by the distance measuring device with a reference value stored in advance in the memory and provides an alarm to the user terminal when the measurement value corresponds to the reference value.

8. The household domestic water monitoring device of claim 1, wherein the communication unit calculates a flow rate of a fluid passing through the pipe part based on a voltage value of the power generated by the self-power generation unit, then multiplies an inner diameter of the pipe part with a calculation value obtained by calculating the flow rate of the fluid passing through the pipe part, and thus calculates a real-time flow rate of the fluid passing through the pipe part.

* * * * *